(12) United States Patent
Nishio

(10) Patent No.: US 6,801,254 B1
(45) Date of Patent: Oct. 5, 2004

(54) IMAGE PICKUP DEVICE IN WHICH THE CHARGE COUPLED DEVICE AND CORRELATED DOUBLE SAMPLING CIRCUITRY ARE ON A CHIP SEPARATE FROM THE GAIN CONTROL AMPLIFIER CIRCUITRY AND ANALOG-TO-DIGITAL CONVERTER CIRCUITRY

(75) Inventor: Kenichi Nishio, Kanagawa (JP)

(73) Assignee: Sony Corporation, Tokyo (JP)

( * ) Notice: Subject to any disclaimer, the term of this patent is extended or adjusted under 35 U.S.C. 154(b) by 743 days.

(21) Appl. No.: 09/657,900

(22) Filed: Sep. 8, 2000

(30) Foreign Application Priority Data

Sep. 10, 1999 (JP) .......................................... P11-258105

(51) Int. Cl.⁷ .......................... H04N 5/217; H04N 9/64; H04N 5/235; G03B 7/00
(52) U.S. Cl. ........................ 348/241; 348/243; 348/362
(58) Field of Search ................................ 348/241, 243, 348/362, 302

(56) References Cited

U.S. PATENT DOCUMENTS

| | | | | |
|---|---|---|---|---|
| 5,329,312 A | * | 7/1994 | Boisvert et al. | ............ 348/256 |
| 5,600,696 A | * | 2/1997 | Sauer | ........................... 377/60 |
| 5,844,431 A | * | 12/1998 | Chen | ........................... 327/94 |
| 6,211,914 B1 | * | 4/2001 | Kubo | ........................... 348/241 |
| 6,538,693 B1 | * | 3/2003 | Kozuka | ...................... 348/241 |
| 6,587,143 B1 | * | 7/2003 | Boisvert | ..................... 348/241 |
| 6,587,144 B1 | * | 7/2003 | Kim | ............................ 348/241 |
| 6,618,090 B1 | * | 9/2003 | Kidono et al. | .............. 348/362 |

FOREIGN PATENT DOCUMENTS

| | | | |
|---|---|---|---|
| EP | 0 831 495 | 7/1999 | |
| JP | 05-111048 | * 10/1991 | ............ H04N/9/73 |

OTHER PUBLICATIONS

Provided English translation of JP–05–111048 Nishiyama.*

* cited by examiner

Primary Examiner—Wendy P. Garber
Assistant Examiner—James M. Hannett
(74) Attorney, Agent, or Firm—Frommer Lawrence & Haug LLP; William S. Frommer; Darren M. Simon

(57) ABSTRACT

A GCA+ADC chip 23 on a main circuit board 20 is supplied with an image signal from a CCD circuit board 1 via an input terminal 21 connected to a line 16. Concurrently, the GCA+ADC chip 23 is supplied with a specified DC reference signal REF 13 from the CCD circuit board 1 via an input terminal 22 connected to the other line 17. An internal operation subtracts the DC reference signal REF from the image signal. Drivers 9 and 10 are provided with the same characteristics. If an interfering noise is picked up during transmission, these signals carry the same contents on respective transmission. This interfering noise is canceled during the subtraction inside the GCA+ADC chip 23.

10 Claims, 7 Drawing Sheets

IMAGE PICKUP DEVICE IN WHICH THE CHARGE COUPLED DEVICE AND CORRELATED DOUBLE SAMPLING CIRCUITRY ARE ON A CHIP SEPARATE FROM THE GAIN CONTROL AMPLIFIER CIRCUITRY AND ANALOG-TO-DIGITAL CONVERTER CIRCUITRY

TECHNICAL FIELD

The present invention relates to an image acquisition circuit and a signal processing method which samples and holds image signal from a solid-state image sensor using a plurality of charge-coupled devices, applies gain to the sampling output, and then converts the output to a digital signal.

PRIOR ART

As shown in FIG. 1, a consumer CCD (charge-coupled device) camera conventionally mounts minimal parts including a CCD 52 on a CCD circuit board 51 placed at the rear of a lens. Generally, such a consumer CCD camera employs the following signal transmission system. A CCD signal (image signal) is buffered in a buffer circuit 53 and is sent to a main circuit board 55 via a flexible wire 54. The signal is then sent to a chip (CCD front end) 57 which integrates a correlated double sampling (called CDS hereafter) circuit 58, a gain control amplifier (called GCA hereafter) 59, and an A/D converter (called ADC hereafter) 60. This signal transmission system is generally used for many camera systems because of a small number of chips, space-saving installation, and cost effectiveness. To maintain high-quality camera images without destroying waveforms, this conventional signal transmission system needs to send a wide-band CCD signal to the CCD front end 57 via the flexible wire 54 between circuit boards. The flexible wire 54 is also used for supplying power and CCD drive pulses.

Conventionally, consumer video cameras use a pixel rate of 18 MHz at the highest. The above-mentioned conventional signal transmission system has been free from serious problems.

According to a recent trend of using high-pixel CCDs, some systems are designed to use a pixel rate of 30 to 40 MHz. A CCD waveform at pixel rate P (Hz) contains two effective data levels (reference and signal levels) per cycle and reset coupling of a CCD's charge-voltage converter. Accordingly, this waveform should contain fundamental-wave components approximately at 4P (Hz). According to a sampling circuit theory, for example, a transmission bandwidth of 1.1Q (Hz), namely 4.4P (Hz), is required for sampling, a signal of pixel rate Q (Hz) at 10-bit accuracy. The above-mentioned CCD needs a bandwidth of approximately 80 MHz when operating at a rate of 18 MHz. The same CCD requires a bandwidth of approximately 180 MHz when operating at a high-speed rate of 40 MHz. When the conventional system configuration is used for a high-speed CCD signal at 30 to 40 MHz, parasitic inductance and capacitance of the flexible wire greatly affects the high-speed CCD signal. It is very difficult to transmit CCD waveform with sufficient performance. If such parasitic inductance and capacitance of the flexible wire is not decreased, the CDS accuracy is degraded and a high S/N ratio can not easily be achieved.

One possible option to solve this problem is shown in FIG. 2. It installs a CCD front end chip on a CCD circuit board 61 near CCD 62 via a capacitor 63. The CCD front end chip 64 comprises a CDS circuit 65, a GCA circuit 66, and an ADC circuit 67. A main circuit board 70 is supplied with 10-bit digital data from a flexible wire 68. The flexible wire 68 is provided with a line 69 which supplies control signals CNT from the main circuit board 70 to the CCD front end chip 64.

This example can solve the above-mentioned problem of CCD waveform transmission between circuit boards, but causes the following problems.

Provision of the CCD front end 64 inevitably increases a CCD circuit board area. An increased area at the rear end of a lens gives serious effect to a design flexibility of small-size products.

The front end chip 64 also heats up the CCD 62, increasing a fixed-pattern noise, especially a white defective noise.

It is necessary to transfer a control signal to the front end chip 64 or transmit high-speed, large-amplitude digital output data between circuit boards. These factors further make it difficult to design small-size products. Letting digital signals pass a flexible wire easily causes a problem due to unnecessary radiation.

FIG. 3 shows another option. A CCD circuit board 71 is provided with a CCD front end chip 74 which integrates a CDS circuit 75 and a GCA circuit 76. The CCD front end chip 74 is connected to a CCD 72 via a capacitor 73. An ADC circuit 80 is mounted on a main circuit board 79 which is connected to the CCD circuit board 71 via a flexible wire 77. The flexible wire 77 contains a line 78 for supplying control signals CNT from the main circuit board 79 to the CCD front end chip 74.

This system just requires a frequency bandwidth of 7P (Hz). The CCD operating at 40 MHz just requires a bandwidth of 44 MHz in contrast to 180 MHz in the above-mentioned example. This value is even smaller than the bandwidth of transmitting an 18 MHz CCD waveform (80 MHz) between circuit boards.

Generally, a chip integrating the CDS circuit and the GCA circuit is not small enough to install on the CCD circuit board. Among three functions needed for the front end, the GCA circuit most consumes power, causing an unsolved problem of heat radiation.

FIG. 4 shows another solution. A CCD 82 and a CDS circuit 84 are mounted on a CCD circuit board 81. The CCD 82 and the CDS circuit 84 are connected via a capacitor 83. A GCA circuit 89 and an ADC circuit 90 are integrated in a same chip 88 and are mounted on a main circuit board 86. The GCA circuit 89 and the ADC circuit 90 are connected to a flexible wire 85 via a capacitor 87.

The system in FIG. 4 transmits CDS outputs between circuit boards in a single-end fashion. If an interfering noise is picked up during the transmission, this system processes and outputs that noise as is.

It is a general practice to supply the CDS chip with a sufficient supply voltage such as 5V-single and perform black level clamping on a succeeding chip input unit for capacity coupling. For providing low power consumption, however, it is desirable to use a 3 V power supply for the CDS chip.

Final outputs from the camera system must comply with digital video (DV), NTSC, or PAL formats. In this case, the camera system needs to be a multi-clock system. For this purpose, the system needs to well resist a beat which is generated due to interference by clocks of different frequencies.

It is undesirable to increase parts installed near the CCD. Installing many parts near the CCD heats the CCD to increase fixed-pattern noise, or places many restrictions on a physical size. This consideration is not limited to high-speed CCDs. It is a general rule to minimize the number of parts mounted on a CCD circuit board.

BRIEF SUMMARY OF THE INVENTION

The present invention has been made in consideration of the foregoing. It is an object of the present invention to provide an image acquisition circuit and a signal processing method which can easily generate image signals with high precision and S/N ratio.

For solving the above-mentioned problems, the image acquisition circuit according to the present invention comprises a first circuit board, a second circuit board, and a wiring unit. On the first circuit board, a CDS chip is mounted near the above-mentioned solid-state image sensing device. The CDS chip samples and holds an image signal from a solid-state image sensor which uses a plurality of charge-coupled devices. The CDS chip then transmits a sampling signal level component as a two-wire signal using two drivers of the same characteristics. The second circuit board comprises a gain control amplifier and an ADC. The gain control amplifier controls gain applied to the above-mentioned sampled signal using the above-mentioned two-wire signal from the CDS chip. The ADC converts the signal level component from this gain control amplifier to a digital signal. The wiring unit connects the first circuit board and the second circuit board by passing the two-wire signal.

For solving the above-mentioned problems, the image signal processing method according to the present invention comprises a first process and a second process. The first process samples and holds an output signal from the solid-state image sensor which uses a plurality of charge-coupled devices. The first process then transmits the sampled signal as a two-wire signal using two drivers ofthe same characteristics. The second process controls gain applied to the above-mentioned sampled signal using the above-mentioned two-wire signal from the first process. The second process then converts the amplified signal into a digital form.

Specifically, the present invention uses two chips for CDS-GCA-ADC processing which is currently performed on a single chip. The CDS chip is mounted on the CCD circuit board. The GCA-ADC chip is mounted on the main circuit board. This architecture minimizes number of wires between the CCD circuit board and the main board, and decreases signal bandwidth to be transmitted between circuit boards down to approximately one fourth of the prior art. Processing is hardly subject to effects of parasitic elements due to transmission between circuit boards.

The CDS chip uses two-wire output. Two same buffer circuits are used for two-wire drivers. An input circuit of the GCA/ADC chip can cancel interfering noise possibly picked up during transmission between circuit boards.

An input clamp is performed on the CDS chip. DC (direct-current) coupling is used for connection between the CDS chip and the GCA/ADC chip. Accordingly, it is possible to operate both chips at a low supply voltage without any additional clamp circuit.

The present invention enables easily generating images with high precision and S/N ratio on an image acquisition system which operates at a high-speed readout clock of 30 to 40 MHz and uses CCD with an extended number of pixels. The present invention provides an excellent immunity against interference noise. The architecture is therefore suitable for a multi-clock camera system for example, where beat noise between different clocks likely becomes a problem. Since no additional clamp circuit is needed, no additional noise occurs therefrom. Another advantage is a 3 V single supply operation, without the need for a 5 V supply, decreasing power consumption. It is also possible to minimize an increase in a circuit board area.

DETAILED DESCRIPTION OF THE INVENTION

Embodiments ofthe present invention will be described in detail, with reference to the accompanying drawings.

First Embodiment

Figure 5:
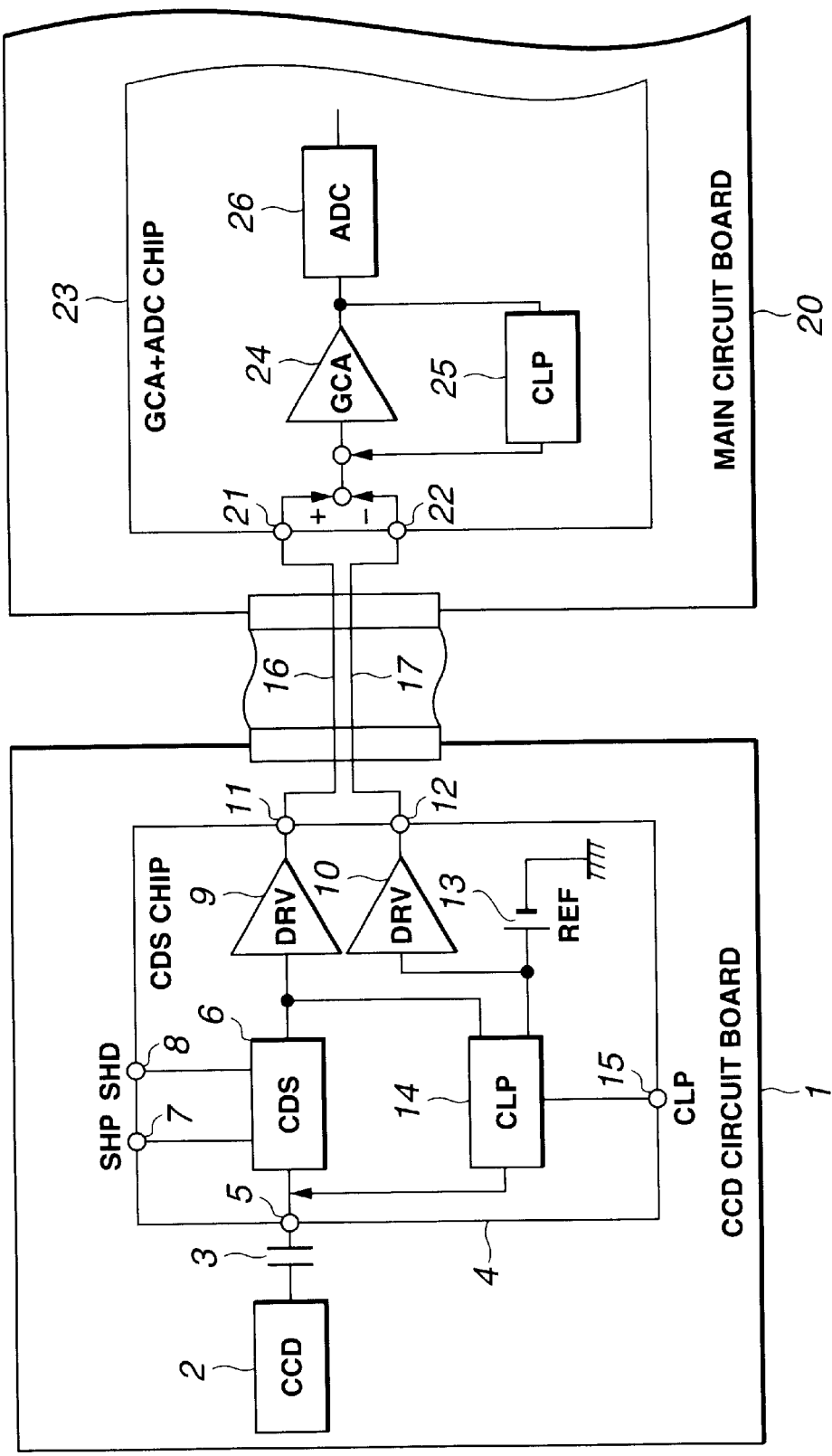
FIG. 5 is a block diagram showing the configuration of a CCD circuit board and a main circuit board used for an image acquisition circuit as the first embodiment of the present invention.
Figure 6:
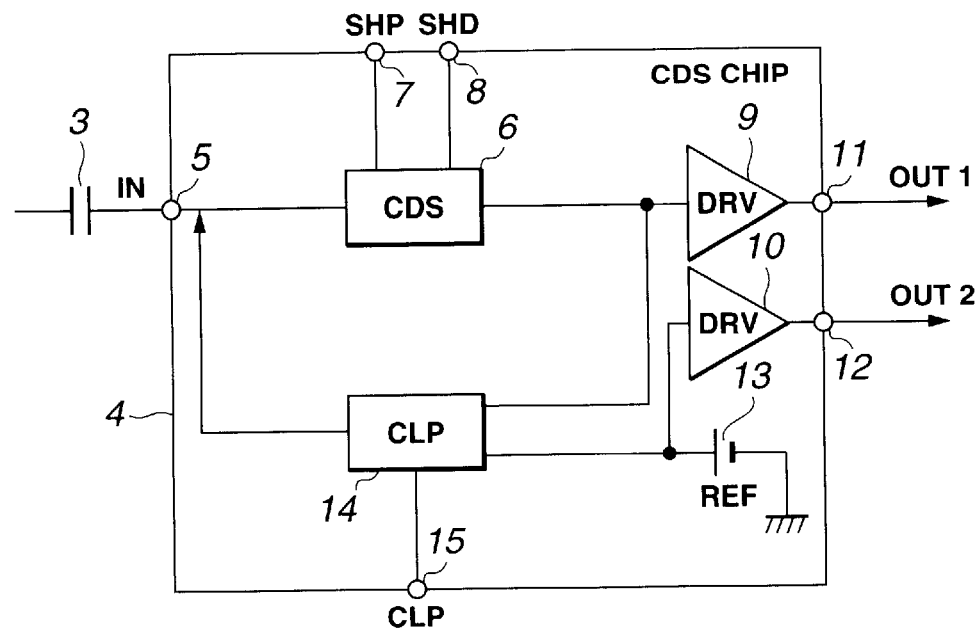
FIG. 6 is a block diagram showing the configuration of a CCD circuit board used for the image acquisition circuit as the above-mentioned first embodiment.

The following describes the first embodiment with reference to FIGS. 5 and 6. The first embodiment is an image acquisition circuit according to the following configuration. A CCD 2 is a solid-state image sensor which converts a subject image to electric signal. The image signal from the CCD 2 is subject to correlated double sampling (CDS), where reset noise and flicker noise are cancelled. Gain applied to the sampled signal is controlled (GCA). That signal is then converted to digital signal by an analog-to-digital converter (ADC). The image acquisition system operates based on an image signal processing method of the present invention. Especially, this image acquisition system employs a CCD readout rate at 30 to 40 MHz in compliance with high-pixel CCDs.

As shown in FIG. 5, this image acquisition system comprises a CCD circuit board 1, a main circuit board 20, and a flexible wire. On the CCD circuit board 1, a CDS chip 4 is mounted near a CCD 2. The CDS chip 4 performs correlated double sampling (CDS) for image signal from the CCD 2. A specified reference DC voltage source REF is used to clamp the sampled signal. The CDS chip 4 uses two driver units 9 and 10 of the same characteristics to send the signal as a two-wire signal. On the main circuit board 20, a GCA+ADC chip 23 is mounted. The GCA+ADC chip 23 comprises a gain control amplifier (GCA) 24 and an analog-to-digital converter (ADC) 26. The gain control amplifier (GCA) 24 controls gain applied to the above-mentioned signal by using the above-mentioned two-wire signal from the CDS chip 4. The analog-to-digital converter (ADC) 26 converts the post-GCA signal to a digital signal. The flexible wire connects the CCD circuit board 1 and the main circuit board 20 by passing the two-wire signal.

As shown in FIGS. 5 and 6, a capacitor 3 is used to capacitively-couple the CCD 2 and the CDS chip 4 on the CCD circuit board 1. The CDS chip 4 on the CCD circuit board 1 comprises a CDS 6, a clamp circuit 14, and two drivers 9 and 10 of the same characteristics.

The CDS 6 performs correlated double sampling for an image signal supplied at an input terminal 5 using a pre-charge sample hold pulse (SHP) and a data sample hold pulse (SHD). The clamp circuit 14 uses a clamp pulse CLP and clamps the sampled signal from the CDS 6 in comparison with a specified DC reference voltage source REF 13. The clamp circuit 14 feeds the signal back to the CDS 6 input. The driver 9 sends the signal level component from the CDS 6 to a line 16 via an output terminal 11. The driver 10 sends the specified DC reference voltage source REF 13 to a line 17 via an output terminal 12.

Figure 1:
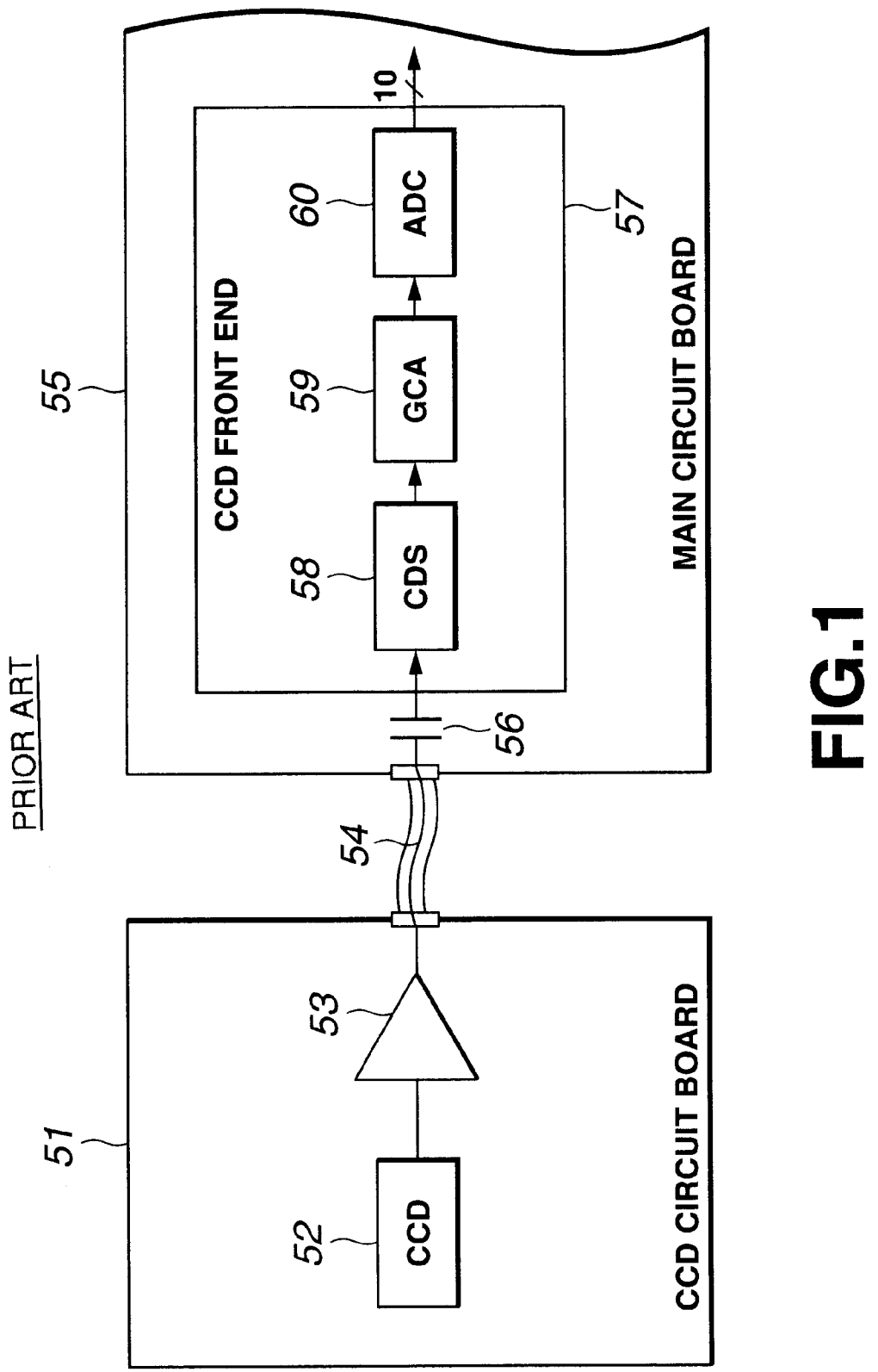
FIG. 1 is a block diagram for the first example showing the configuration of a CCD circuit board and a main circuit board used for a conventional image acquisition circuit.
Figure 2:
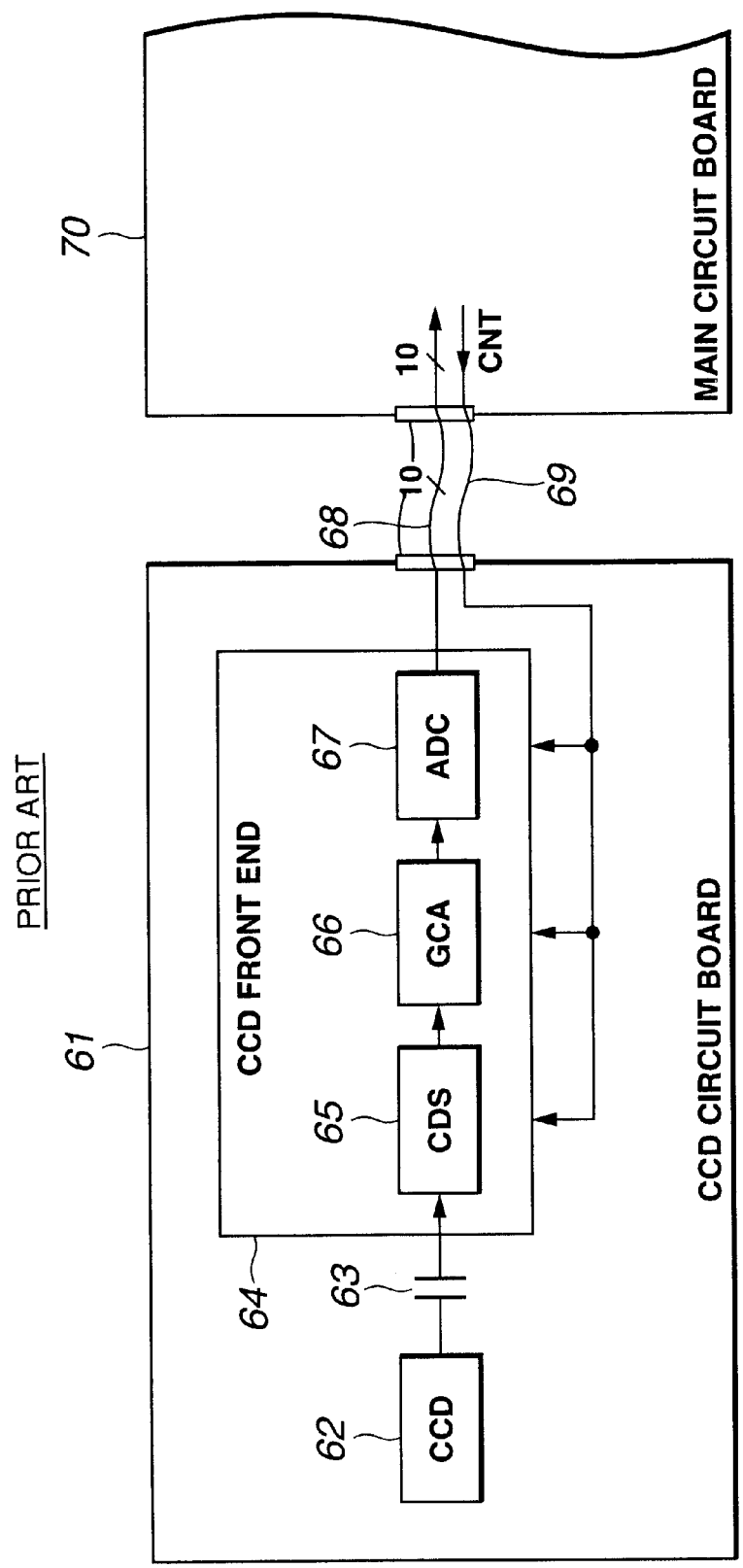
FIG. 2 is a block diagram for the second example showing the configuration of a CCD circuit board and a main circuit board used for a conventional image acquisition circuit.
Figure 3:
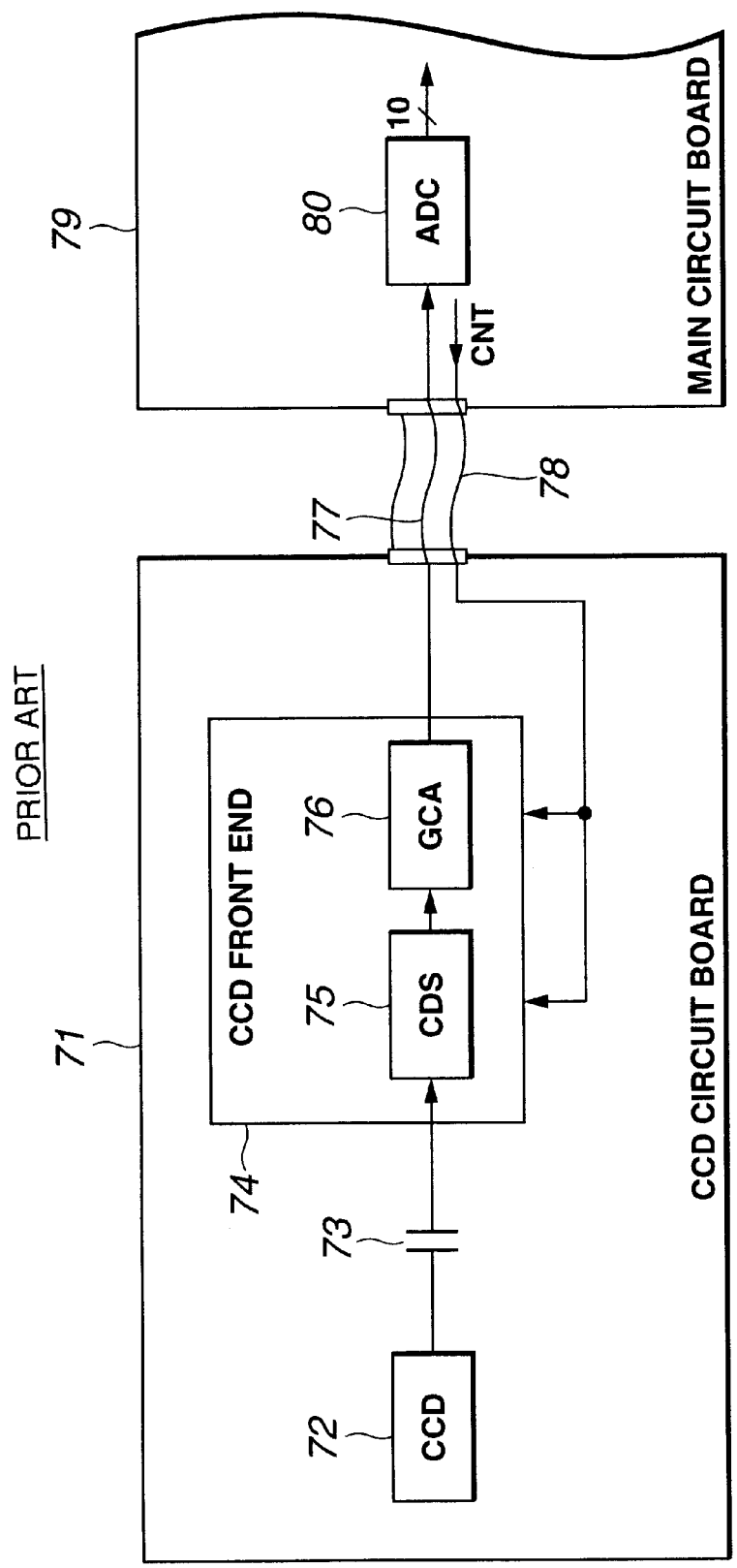
FIG. 3 is a block diagram for the third example showing the configuration of a CCD circuit board and a main circuit board used for a conventional image acquisition circuit.
Figure 4:
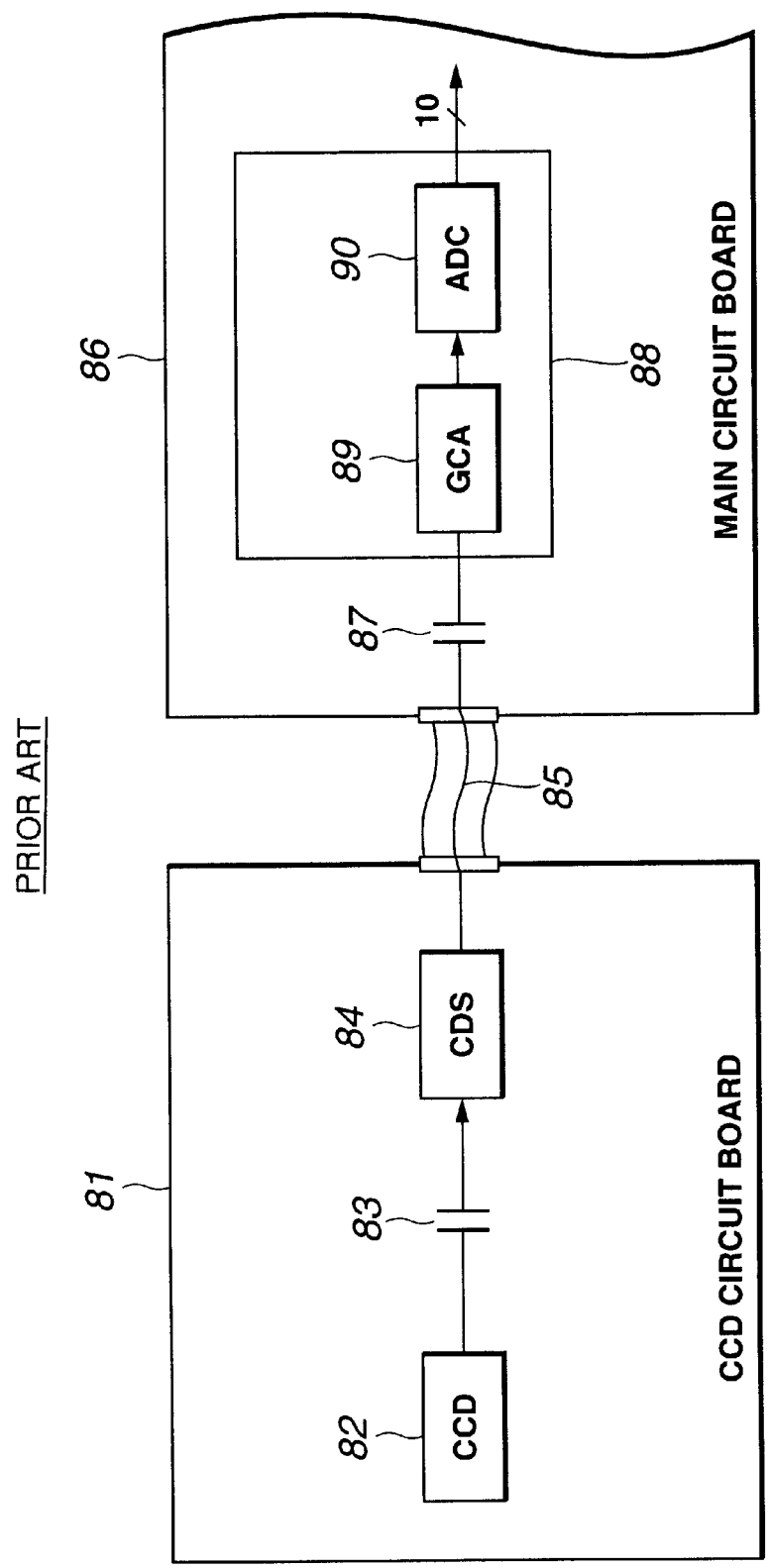
FIG. 4 is a block diagram for the fourth example showing the configuration of a CCD circuit board and a main circuit board used for a conventional image acquisition circuit.

The clamp circuit 14 clamps the above-mentioned image signal at the specified DC reference voltage source REF 13. Using the clamp circuit 14, the CDS chip 4 can operate under a supply whose voltage is lower than that for the prior art, say, as shown in FIG. 4. Because of an unstabilized input DC voltage, the CDS 84 in FIG. 4 requires a supply voltage large enough to process a specified signal voltage. While the main circuit board requires a supply voltage of 3 V, the CCD circuit board requires 5 V. By contrast, the CDS chip 4 in FIG. 5 uses the clamp circuit 14 to clamp outputs from the CDS 6 in comparison with the specified DC reference voltage source REF and feeds back the result. An input DC bias level of the CDS 6 thus stabilized. The same supply voltage of 3 V can be used for both the CCD circuit board and the main circuit board.

The GCA+ADC chip 23 on the main circuit board 20 is supplied with the image signal from the CCD circuit board 1 via an input terminal 21 connected to the line 16. Concurrently, the GCA+ADC chip 23 is supplied with a common-mode DC bias specified by the DC reference voltage source REF 13 from the CCD circuit board 1 via an input terminal 22 connected to the other line 17. An internal, differential operation for the GCA+ADC chip 23 subtracts the specified DC reference signal REF input from the image signal for canceling noises. The drivers 9 and 10 are provided with the same characteristics. If an interfering noise is picked up during transmission, the same noise contents result in the transmitted signals (image signal and DC reference signal). This interfering noise is canceled during the above-mentioned differential operation inside the GCA+ADC chip 23.

The output deprived of the interfering noise is equivalent to the image signal in which the input DC bias component is also subtracted from the input signal. The GCA 24 applies gain control to and amplifies the image signal. A clamp circuit 25 is installed at an output stage of the GCA 24. The clamp circuit 25 clamps an output signal from the GCA 24 and sends the signal to an ADC 26. The ADC 26 converts the clamped output signal from the GCA 24 to digital signal and sends this signal to, say, a DRAM (not shown). The digital signal stored in the DRAM is subject to specified signal processing and is displayed on, say, an LCD monitor. Alternatively, this digital signal is subject to a specified compression and is recorded on tape storage media or the like.

Conventionally, as shown in FIG. 4, the GCA+ADC chip is capacity-coupled with the CCD circuit board. As mentioned above, the image acquisition circuit in FIG. 5 uses the same supply voltage of, say, 3 V for the CCD circuit board 1 and the GCA+ADC chip 23. This image acquisition circuit eliminates the need for capacitive coupling and enables DC coupling.

Second Embodiment

Figure 7:
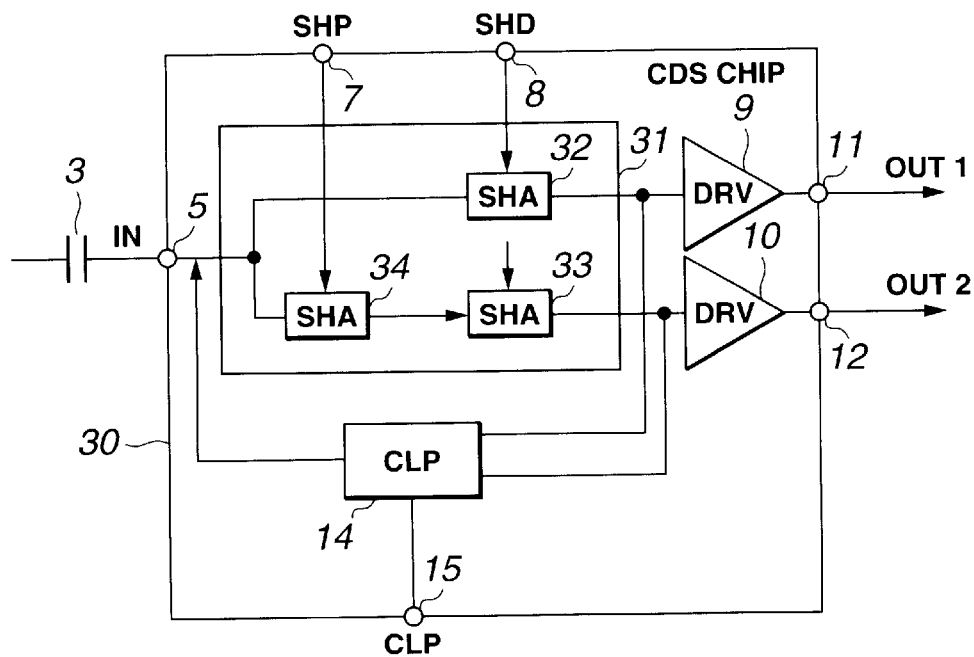
FIG. 7 is a block diagram showing the configuration of a CCD circuit board used for the image acquisition circuit as the second embodiment of the present invention.

The following describes the second embodiment of the present invention with reference to FIG. 7. The second embodiment is an image acquisition circuit which uses a CDS chip 30 in FIG. 7 instead of a CDS chip 4 in FIG. 6 in the first embodiment in FIG. 5.

This image acquisition circuit also uses the CCD 2 as a solid-state image sensor which converts a subject image to an electric signal. An image signal from the CCD 2 is subject to correlated double sampling (CDS). Gain applied to the sampled signal is controlled (GCA). That signal is then converted to a digital signal (ADC). This image acquisition circuit also employs a CCD pixel rate at 30 to 40 MHz in compliance with high-pixel CCDs.

The CDS chip 30 includes a CDS 31 whose configuration is illustrated in FIG. 7. An image signal is input to the input terminal 5 from the CCD 2. The CDS 31 uses a sample hold amplifier (SHA) 32 to sample the image signal according to a SHD pulse from a terminal 8 and sends a image signal to the driver 9. An SHA 34 samples a black level in the image signal according to an SHP pulse from a terminal 7. For a matched sampling timing, SHA 33 holds the signal according to an SHD pulse and sends the signal to the driver 10.

The clamp circuit 14 is supplied with the image signal and the black level component from the CDS 31. Using a clamp pulse CLP from a terminal 15, the clamp circuit 14 clamps the image signal in comparison with the black level component and feeds the result back to the CDS 31 input. The driver 9 sends the image signal (OUT1) from the CDS 31 to the line 16 via the output terminal 11. The driver 10 sends the black level component (OUT2) to the line 17 via the output terminal 12.

The clamp circuit 14 clamps the image signal (OUT1) and the black level component (OUT2). Using the clamp circuit 14, as mentioned above, the CDS chip 30 can lower the supply voltage that matches the supply voltage for the main circuit board.

The GCA+ADC chip 23 on the main circuit board 20 is supplied with a image signal (OUT 1) from the CCD circuit board 1 via an input terminal 21 connected to the line 16. Concurrently, the GCA+ADC chip 23 is supplied with the black level component (OUT2) from the CCD circuit board 1 via an input terminal 22 connected to the other line 17. An internal operation for the GCA+ADC chip 23 subtracts the black level component from the image signal. The drivers 9 and 10 are provided with the same characteristics. If an interfering noise is picked up during transmission, these drivers carry the same contents on transmitted signals (image signal and black level component). This interfering noise is canceled during the above-mentioned subtraction inside the GCA+ADC chip 23.

A subtraction output deprived of the interfering noise is equivalent to the image signal in which the black level component is subtracted from the image signal. The GCA 24 applies gain control to and amplifies the image signal. A clamp circuit 25 is installed at an output stage of the GCA 24. The clamp circuit 25 clamps an output signal from the GCA 24 and sends the signal to an ADC 26. The ADC 26 converts the clamped output signal from the GCA 24 to a digital signal and sends this signal to, say, a DRAM (not shown) as mentioned above. The digital signal stored in the DRAM is subject to specified signal processing and is displayed on, say, an LCD monitor. Alternatively, this digital signal is subject to a specified compression and is recorded on tape storage media or the like.

The second embodiment also uses the same supply voltage of, say, 3 V for the CCD circuit board 1 and the GCA+ADC chip 23. This embodiment eliminates the need for capacitive coupling and enables DC coupling.

Third Embodiment

Figure 8:
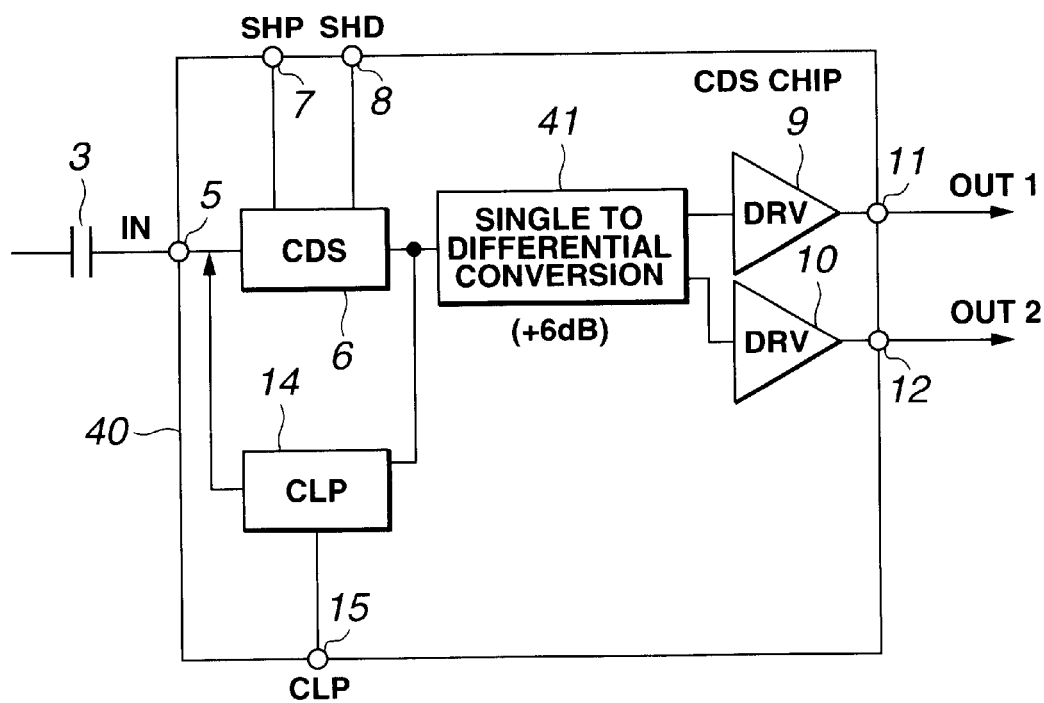
FIG. 8 is a block diagram showing the configuration of a CCD circuit board used for the image acquisition circuit as the third embodiment ofthe present invention.

The following describes the third embodiment of the present invention with reference to FIG. 8. The third embodiment is an image acquisition circuit which uses a CDS chip 40 in FIG. 8 instead of a CDS chip 4 in FIG. 6 in the first embodiment in FIG. 5.

This image acquisition circuit also uses the CCD 2 as a solid-state image sensor which converts a subject image to an electric signal. An image signal from the CCD 2 is subject to correlated double sampling (CDS). Gain applied to the sampled signal is controlled (GCA). That signal is then converted to a digital signal (ADC). This image acquisition circuit also employs a CCD pixel rate at 30 to 40 MHz in compliance with high-pixel CCDs.

The CDS chip 40 is provided with the CDS6, the clamp circuit 14, and drivers 9 and 10 same as the CDS chip 4 shown in FIG. 6. The third embodiment differs from the first embodiment as follows. A single to differential converter 41 is provided at the rear stage of the CDS 6. The single to differential converter 41 applies +6 dB gain to the input signal, providing both positive and negative image signals at the output. These amplified signals are supplied to drivers 9 and 10. The driver 9 sends the sampled signal or the image signal (OUT1) amplified in the single to differential converter 41 to the line 16 via the output terminal 11. The driver 10 sends the reversed image signal (OUT2) amplified in the single to differential converter 41 to the line 17 via the output terminal 12.

At the stage prior to the single to differential converter 41, the above-mentioned image signal from the CDS 6 is supplied to the clamp circuit 14. Using a clamp pulse CLP from the terminal 15, the clamp circuit 14 clamps the image signal in comparison with the specified DC reference signal and feeds the result back to the CDS 6 input.

The clamp circuit 14 clamps the image signal (OUT 1). Using the clamp circuit 14, as mentioned above, the CDS chip 40 can lower the supply voltage that matches the voltage for the main circuit board.

The GCA+ADC chip 23 on the main circuit board 20 is supplied with a image signal (OUT 1) from the CCD circuit board 1 via an input terminal 21 connected to the line 16. Concurrently, the GCA+ADC chip 23 is supplied with the reversed image signal (OUT2) from the CCD circuit board 1 via an input terminal 22 connected to the other line 17. An internal operation for the GCA+ADC chip 23 is differential, where the negative image signal is subtracted from the positive image signal. The drivers 9 and 10 are provided with the same characteristics. If an interfering noise is picked up during transmission, these drivers carry the same contents on the respective transmitted signals. This interfering noise is canceled during the above-mentioned subtraction inside the GCA+ADC chip 23.

A subtraction output deprived of the interfering noise is equivalent to the image signal. The GCA 24 applies gain control to and amplifies the image signal. The clamp circuit 25 is installed at an output stage of the GCA 24. The clamp circuit 25 clamps an output signal from the GCA 24 and sends the signal to the ADC 26. The ADC 26 converts the clamped output signal from the GCA 24 to a digital signal and sends this signal to, say, a DRAM (not shown) as mentioned above. The digital signal stored in the DRAM is subject to specified signal processing and is displayed on, say, an LCD monitor. Alternatively, this digital signal is subject to a specified compression and is recorded on tape storage media or the like.

The third embodiment also uses the same supply voltage of, say, 3 V for the CCD circuit board 1 and the GCA+ADC chip 23. This embodiment eliminates the need for capacitive coupling and enables DC coupling.

What is claimed is:

1. An image acquisition circuit comprising:

a first circuit board, wherein a correlated double sampling chip is installed near a solid-state image sensor using a plurality of charge-coupled devices, wherein said correlated double sampling chip sampled signal, and wherein said correlated double sampling chip uses two drivers having the same characteristics to send said sampled signal as a two-wire signal;

a second circuit board having a gain control amplifier and an analog-to-digital converter, wherein a differential operation is performed on said two-wire signal to cancel noise picked up during transmission from said correlated double sampling chip thereby reproducing said sampled signal, said gain control amplifier controls a gain in said sampled signal, a clamping circuit is applied to the output of the gain control amplifier to clamp the sampled signal, and wherein said analog-to-digital converter converts the clamped sampled signal to digital signal; and a wiring unit which connects said first circuit board with said second circuit board and transmits said two-wire signal.

2. An image acquisition circuit according to claim 1, wherein a clamp unit for clamping said sampled signal is installed in said correlated double sampling chip mounted on said first circuit board.

3. An image acquisition circuit according to claim 1, wherein said two-wire signal comprises said sampled signal and a specified direct-current (DC) reference signal.

4. An image acquisition circuit according to claim 1, wherein said two-wire signal comprises said sampled signal and a black level component in said image signal.

5. An image acquisition circuit according to claim 1, wherein said two-wire signal is a differential output signal which is extracted from said sampled signal by means of differential conversion.

6. An image signal processing method comprising:

a first process performed on a first chip, wherein said first process samples and holds an output signal from a solid-state image sensor using a plurality of charge-coupled devices to produce a sampled signal and uses two drivers having the same characteristics to send said sampled signal as a two-wire signal; and a second process performed on a second chip connected to said first chip by a wiring unit, wherein said second process performs a differential operation on said two-wire signal from said first process to cancel noise picked up during transmission from said first chip thereby reproducing said sampled signal, controlling a gain in said sampled signal to produce a gain-controlled sampled signal, clamping the gain-controlled sampled signal, and converting the clamped sampled signal to a digital signal.

7. An image signal processing method according to claim 6, wherein said first process clamps said sampled signal.

8. An image signal processing method according to claim 6, wherein said two-wire signal comprises said sampled signal and a specified DC reference signal.

9. An image signal processing method according to claim 6, wherein said two-wire signal comprises said sampled signal and a black level component in said image signal.

10. An image signal processing method according to claim 6, wherein said two-wire signal is a differential output signal which is extracted from said sampled signal by means of differential conversion.

* * * * *